United States Patent
Kroc et al.

(10) Patent No.: US 11,054,544 B2
(45) Date of Patent: Jul. 6, 2021

(54) HIGH-ENERGY X-RAY SOURCE AND DETECTOR FOR WELLBORE INSPECTION

(71) Applicant: Fermi Research Alliance, LLC, Batavia, IL (US)

(72) Inventors: Thomas K Kroc, Batavia, IL (US); Robert Kephart, Pioneer, CA (US)

(73) Assignee: FERMI RESEARCH ALLIANCE, LLC, Batavia, IL (US)

( * ) Notice: Subject to any disclaimer, the term of this patent is extended or adjusted under 35 U.S.C. 154(b) by 305 days.

(21) Appl. No.: 16/043,047

(22) Filed: Jul. 23, 2018

(65) Prior Publication Data
US 2019/0025456 A1 Jan. 24, 2019

Related U.S. Application Data

(60) Provisional application No. 62/536,050, filed on Jul. 24, 2017.

(51) Int. Cl.
| | |
|---|---|
| *G01V 5/12* | (2006.01) |
| *G01V 5/00* | (2006.01) |
| *G01N 23/046* | (2018.01) |
| *G01V 5/04* | (2006.01) |
| *G02B 27/30* | (2006.01) |
| *G01N 23/203* | (2006.01) |

(52) U.S. Cl.
CPC ............ *G01V 5/12* (2013.01); *G01N 23/046* (2013.01); *G01N 23/203* (2013.01); *G01V 5/0025* (2013.01); *G01V 5/045* (2013.01); *G02B 27/30* (2013.01); *G01N 2223/616* (2013.01)

(58) Field of Classification Search
CPC .......... G01N 2223/616; G01N 23/046; G01N 23/203; G01V 5/0025; G01V 5/045; G01V 5/12; G02B 27/30
See application file for complete search history.

(56) References Cited

U.S. PATENT DOCUMENTS

| | | | |
|---|---|---|---|
| 3,564,251 A | 2/1971 | Youmans | |
| 3,976,879 A | 8/1976 | Turcotte et al. | |
| 4,093,854 A | 6/1978 | Turcotte et al. | |
| 4,340,405 A | 7/1982 | Steyert et al. | |

(Continued)

FOREIGN PATENT DOCUMENTS

| | | |
|---|---|---|
| CA | 2968429 | 5/2016 |
| GB | 2486057 | 6/2012 |

(Continued)

OTHER PUBLICATIONS

Paul Boughton, X-ray imaging for oil wells, Engineerlive, Jan. 15, 2015, published online.

*Primary Examiner* — Roy Y Yi
*Assistant Examiner* — Geoffrey T Evans
(74) *Attorney, Agent, or Firm* — Loza & Loza LLP; Kevin L. Soules (57) ABSTRACT

A system, method, and apparatus for wellbore inspection comprise an electron accelerator to generate X-rays, a rotating collimator assembly configured to produce a cone of X-rays, and at least one detector assembly configured to collect backscattered X-rays. A position assembly can be provided to move the electron accelerator, rotating collimator assembly, and detector through a wellbore. A computer system is configured to receive data from the detector and generate an image of the wellbore.

17 Claims, 9 Drawing Sheets

(56) References Cited

U.S. PATENT DOCUMENTS

| | | | |
|---|---|---|---|
| 4,375,157 A | 3/1983 | Boesen | |
| 4,713,581 A * | 12/1987 | Haimson | H05H 7/02 |
| | | | 250/266 |
| 4,780,858 A | 10/1988 | Clerke et al. | |
| 4,883,956 A | 11/1989 | Mecher et al. | |
| 4,938,060 A | 7/1990 | Sizer et al. | |
| 6,078,867 A | 6/2000 | Plumb | |
| 7,564,948 B2 | 7/2009 | Wraight et al. | |
| 7,634,059 B2 | 12/2009 | Wraight et al. | |
| 7,668,293 B2 | 2/2010 | Wraight et al. | |
| 7,675,029 B2 | 3/2010 | Ramstad | |
| 7,705,294 B2 | 4/2010 | Ramstad et al. | |
| 7,817,781 B2 | 10/2010 | Wraight et al. | |
| 7,894,577 B2 | 2/2011 | Teague et al. | |
| 7,960,687 B1 | 6/2011 | Simon et al. | |
| 7,991,111 B2 | 8/2011 | Wraight et al. | |
| 8,138,471 B1 | 3/2012 | Shedlock et al. | |
| 8,466,412 B2 | 6/2013 | Teague et al. | |
| 8,481,919 B2 | 7/2013 | Teague | |
| 9,671,520 B2 * | 6/2017 | Botto | H05H 9/02 |
| 9,817,152 B2 | 11/2017 | Sofiienko et al. | |
| 2004/0264543 A1 | 12/2004 | Storm et al. | |
| 2005/0097911 A1 | 5/2005 | Revellat et al. | |
| 2006/0033417 A1 * | 2/2006 | Srinivasan-Rao | H01J 3/021 |
| | | | 313/399 |
| 2006/0144619 A1 | 7/2006 | Storm et al. | |
| 2009/0175415 A1 | 7/2009 | Ramstad et al. | |
| 2012/0126104 A1 | 5/2012 | Teague | |
| 2012/0318992 A1 | 12/2012 | Teague | |
| 2014/0241494 A1 | 8/2014 | Spannuth | |
| 2014/0254764 A1 | 9/2014 | Safinya | |
| 2015/0168579 A1 * | 6/2015 | Perkins | G01V 5/12 |
| | | | 378/53 |
| 2015/0177409 A1 | 6/2015 | Sofiienko et al. | |
| 2015/0345254 A1 | 12/2015 | Ciglenec et al. | |
| 2016/0187528 A1 * | 6/2016 | Sofiienko | G01N 23/203 |
| | | | 250/269.1 |
| 2016/0320318 A1 | 11/2016 | Safinya et al. | |
| 2018/0003854 A1 * | 1/2018 | Simon | E21B 49/00 |
| 2018/0187512 A1 * | 7/2018 | Savery | E21B 33/16 |
| 2018/0188411 A1 * | 7/2018 | Teague | G01N 9/24 |
| 2019/0004205 A1 * | 1/2019 | Lee | G01V 5/08 |

FOREIGN PATENT DOCUMENTS

| | | |
|---|---|---|
| WO | WO/2005/02233 | 3/2005 |
| WO | WO/2010/138607 | 12/2010 |
| WO | WO/2013/119125 | 8/2013 |
| WO | WO/2016/078727 | 11/2014 |

* cited by examiner

HIGH-ENERGY X-RAY SOURCE AND DETECTOR FOR WELLBORE INSPECTION

CROSS REFERENCE TO RELATED PATENT APPLICATIONS

This patent application claims priority under 35 U.S.C. § 119(e) to, and the benefit of, U.S. provisional patent application 62/536,050 entitled "High-Energy X-Ray Source and Detector for Wellbore Inspection", which was filed on Jul. 24, 2017. U.S. Provisional Patent Application Ser. No. 62/536,050 is incorporated herein by reference in its entirety.

STATEMENT OF GOVERNMENT RIGHTS

The invention described in this patent application was made with Government support under the Fermi Research Alliance, LLC, Contract Number DE-AC02-07CH11359, awarded by the U.S. Department of Energy. The Government has certain rights in the invention.

TECHNICAL FIELD

Embodiments are generally related to the field of subsurface imaging. Embodiments are further related to the field of electron accelerators. Embodiments are also related to methods, systems, and devices for ultra-compact high-energy electron accelerators used to produce high-energy X-rays. Embodiments are further related to methods, systems, and devices for subsurface X-ray imaging.

BACKGROUND

Prior subsurface imaging technology relies on X-ray tubes. X-ray tubes are not sufficient to provide quality subsurface imaging because such methods do not provide adequate penetration. Specifically, prior art methods are insufficient to precisely image deep into rock strata because the X-ray energy is too low. Even the highest voltage prior art X-ray tubes (operated at 450 kV) have peak X-ray emission at about 50 keV. Compton back-scattered X-rays are further reduced substantially in energy (~15 keV) from this value. As a result, prior art methods offer poor penetrating power and resolution.

Current state-of-the-art well logging techniques cannot identify micro-conduits, particularly in multiple casing configurations. Cement bond logs use ultrasonic emissions that detect casing resonance and reflections from the casing. Unbonded casings have higher resonance than bonded casings. Reflected sound amplitude and waveforms are indicators that provide information. This technique has major shortcomings and improved techniques are needed. In particular, large flaws are detectable, but micro-channels in cement/casing are difficult to detect, even with scanning ultrasonic sources. When two or more strings of casing are present, a not uncommon circumstance, the sonic tool cannot measure integrity of the outermost cement bond to the surrounding rock.

Accordingly, there is a need in the art for methods and systems for improved subsurface imaging, as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for subsurface interrogation of surrounding material.

It is another aspect of the disclosed embodiments to provide a method, system, and apparatus for subsurface imaging.

It is an aspect of the disclosed embodiments to provide a method, system, and apparatus for X-ray sources and associated detectors.

It is another aspect of the disclosed embodiments to provide a method, system, and apparatus for high-energy X-ray sources and detectors for wellbore inspection.

It will be appreciated that the methods and systems can be achieved according to the embodiments disclosed herein. In one such embodiment, a wellbore inspection system and apparatus can comprise an electron accelerator to generate X-rays, a rotating collimator assembly configured to produce a cone of X-rays, and at least one detector assembly configured to collect backscattered X-rays. The electron accelerator further comprises an RF accelerating cavity and an electron gun. In an embodiment the rotating collimator assembly further comprises a rotating magnet, an X-ray target, and a beam collimator. The beam collimator can further comprise a pencil beam collimator. In an embodiment at least one detector assembly further comprises a plurality of longitudinally arranged X-ray detectors configured between a plurality of collimation channels.

In certain embodiments, the wellbore inspection system and apparatus further comprise an assembly configured to move the electron accelerator, the rotating collimator assembly, and the at least one detector through a wellbore. The wellbore inspection system and apparatus further comprise a computer system configured to receive data from the detector and generate an image of a wellbore.

In another embodiment, a wellbore inspection method comprises generating an electron beam with an electron accelerator, producing a cone of X-rays from the electron beam with a rotating collimator assembly, and collecting backscattered X-rays with at least one detector assembly. The electron accelerator further comprises an RF accelerating cavity and an electron gun.

In an embodiment, the method further comprises rotating a magnet by which the electron beam passes, directing the electron beam on an X-ray target, and collimating resulting X-rays with a beam collimator.

In an embodiment, the wellbore inspection method further comprises positioning the electron accelerator, the rotating collimator assembly, and the at least one detector in a wellbore with a positioning assembly. The wellbore inspection method further comprises analyzing the collected backscattered X-rays with a computer system, creating an image of a wellbore according to the analysis with the computer system, and identifying defects in the wellbore with a computer system.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Subject matter will now be described more fully hereinafter with reference to the accompanying drawings, which form a part hereof, and which show, by way of illustration, specific example embodiments. The particular values and configurations discussed in the following non-limiting examples can be varied, and are cited merely to illustrate one or more embodiments and are not intended to limit the scope thereof.

Example embodiments described more fully hereinafter with reference to the accompanying drawings, are illustrative of the embodiments shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or" as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
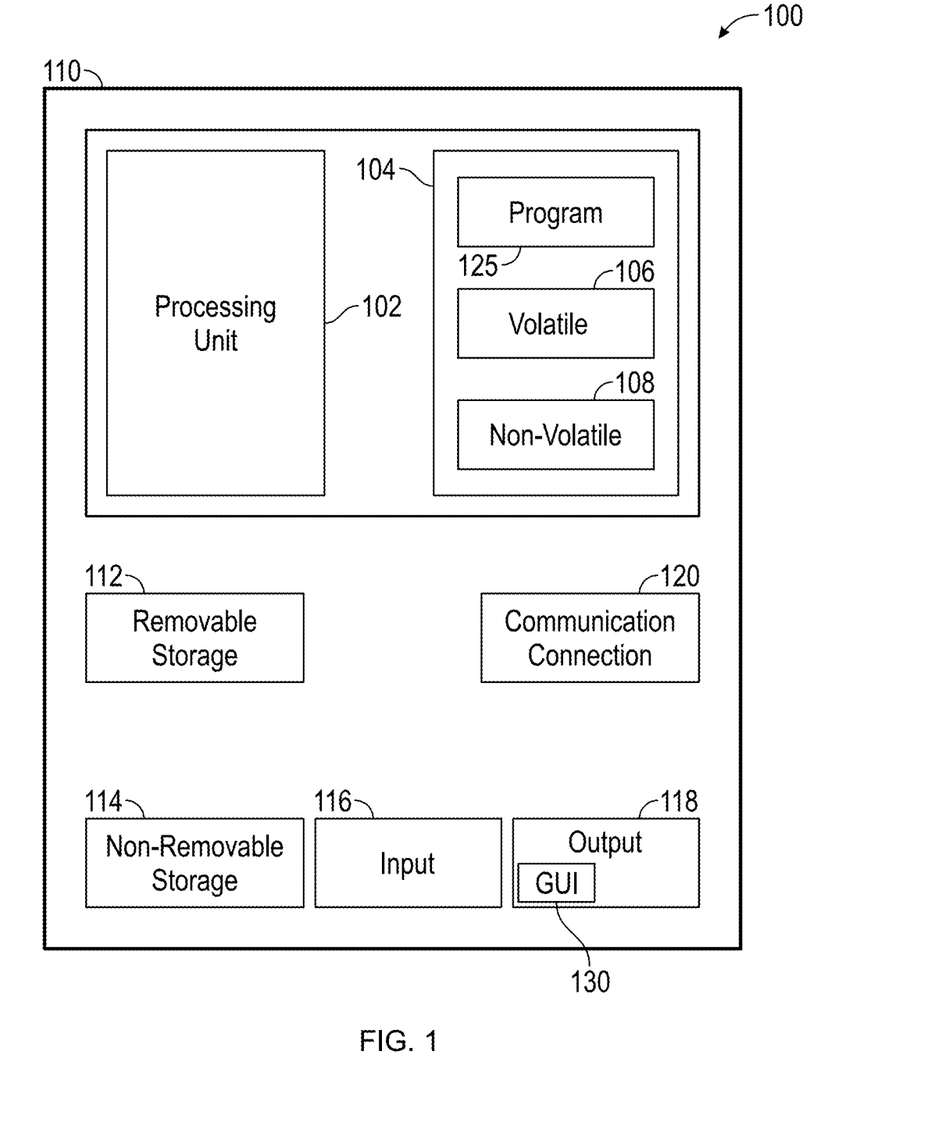
FIG. 1 depicts a block diagram of a computer system which is implemented in accordance with the disclosed embodiments.
Figure 2:
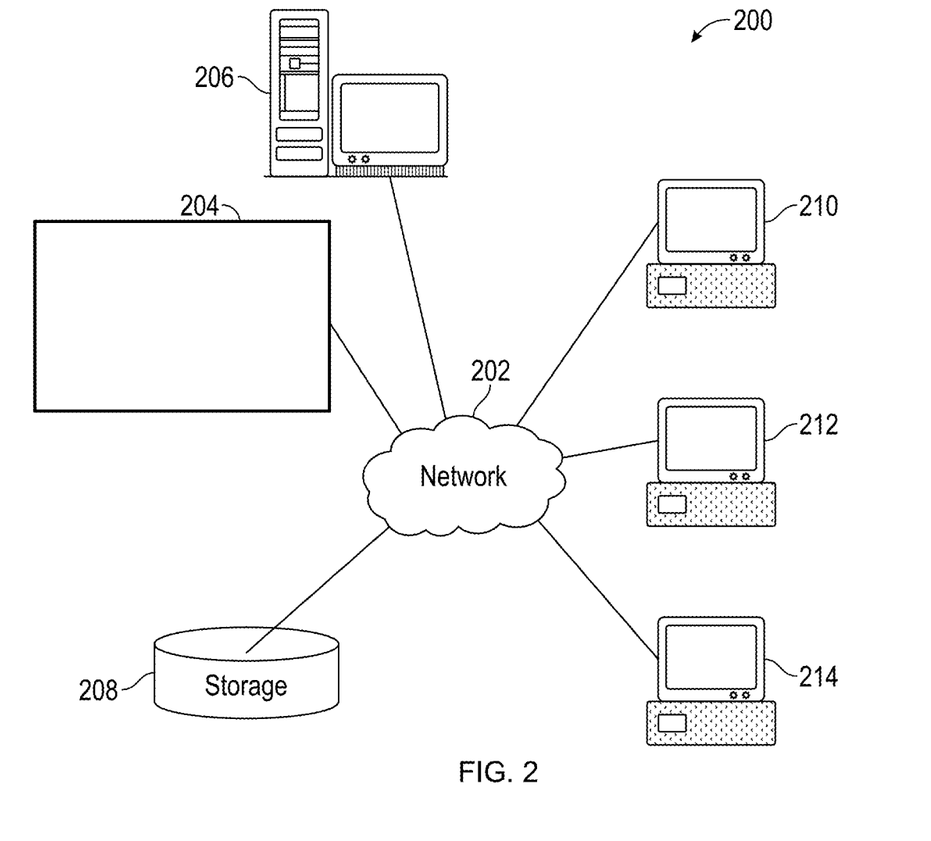
FIG. 2 depicts a graphical representation of a network of data-processing devices in which aspects of the present embodiments may be implemented.
Figure 3:
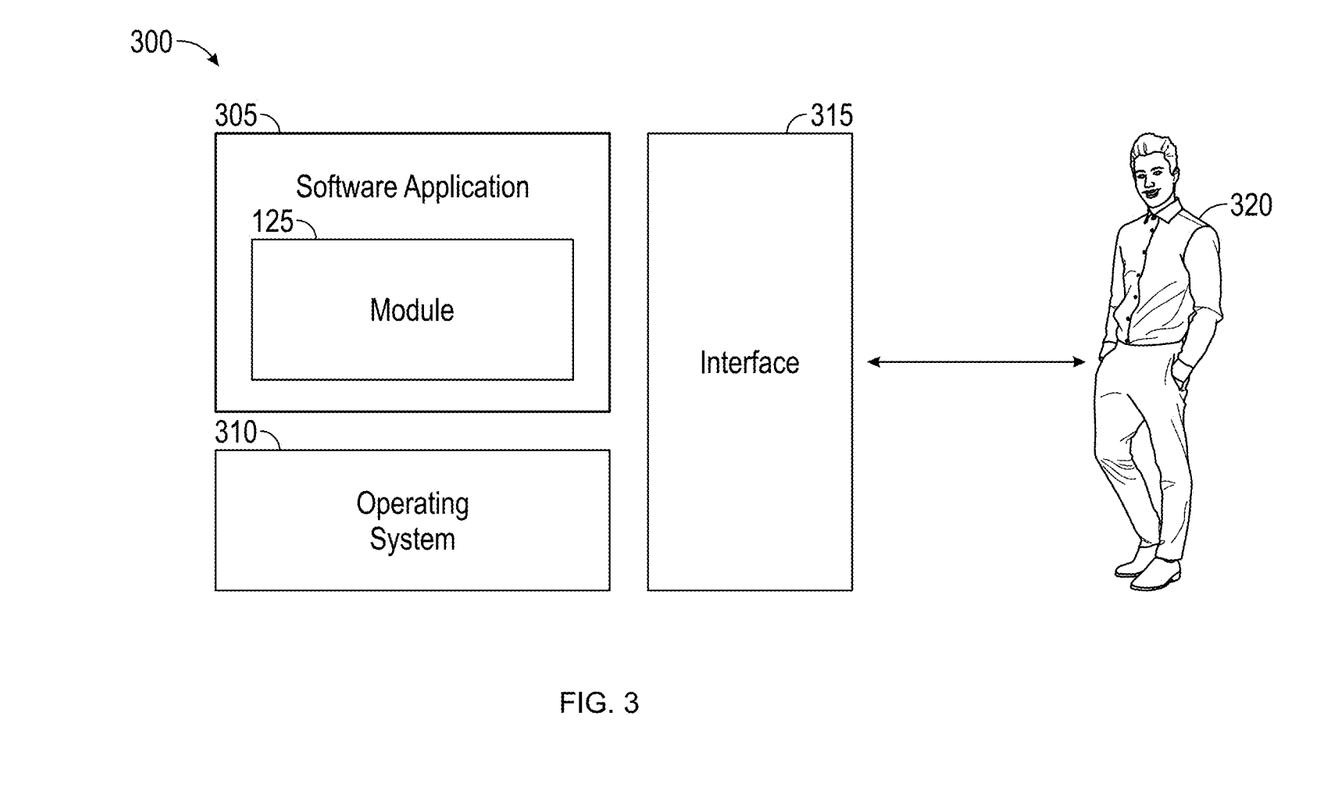
FIG. 3 depicts a computer software system for directing the operation of the data-processing system depicted in FIG. 1, in accordance with an example embodiment.

FIGS. 1-3 are provided as exemplary diagrams of data-processing environments in which embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with controllers, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 and/or input 116 may include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present embodiments may be implemented. Network data-processing system 200 is a network of computers or other such devices including mobile phones, smartphones, sensors, controllers, speakers, and other such devices all of which are collectively a part of the "internet of things," in which embodiments may be implemented. Note that the system 200 can be implemented in the context of a software module such as program module 125. The system 200 includes a network 202 in communication with one or more clients 210, 212, and 214. Network 202 may also be in communication with one or more devices 204, servers 206, and storage 208. Network 202 is a medium that can be used to provide communications links between various devices and computers connected together within a networked data processing system such as computer system 100. Network 202 may include connections such as wired communication links, wireless communication links of various types, and fiber optic cables. Network 202 can communicate with one or more servers 206, one or more external devices such as device 204, and a memory storage unit such as, for example, memory or database 208. It should be understood that device 204 may be embodied as a detector device, controller, receiver, transmitter, transceiver, transducer, RFID enabled device, or other such device.

In the depicted example, device 204, server 206, and clients 210, 212, and 214 connect to network 202 along with storage unit 208. Clients 210, 212, and 214 may be, for example, personal computers or network computers, hand-held devices, mobile devices, tablet devices, smartphones, personal digital assistants, printing devices, recording devices, speakers, MFDs, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments.

FIG. 3 illustrates a software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smartphones, tablet devices multi-processor systems, printers, copiers, fax machines, multi-function devices, data networks, microprocessor-based or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines;

and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments, which can be embodied in the context of or require the use of a data-processing system such as computer system 100, in conjunction with program module 125, and data-processing system 200 and network 202 depicted in FIGS. 1-3. The present embodiments, however, are not limited to any particular application or any particular environment. Instead, those skilled in the art will find that the system and method of the present embodiments may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

The embodiments disclosed herein provide methods and systems to quickly image oil and gas wells, and ensure their safety, seal integrity, and to assess their potential productivity.

Knowledge of the structures surrounding a well and the condition of the well structure, are important to various industries. This knowledge is useful for environmental reasons, such as detecting the leakage of gases and liquids into the surrounding aquifers and air. It is also useful in determining the potential of a well. Knowledge of the rock density and the degree of fracturing are directly related to well production. Detecting the condition of casings, and the cement associated with the casings, is also useful. These are examples of the utility of the information that can be derived from the systems and methods disclosed herein.

The embodiments presented herein provide a 3-dimensional subsurface imaging system which uses an ultra-compact high-energy electron accelerator (e.g., 5-40 MeV) to produce high-energy X-rays that can penetrate deeply (e.g., 50-100 cm) into solid matter. The X-rays can then be used for Compton backscatter imaging. The embodiments can be used, in conjunction with computed-tomography, to fully image the casing/cement/rock environment. The resulting imagery can be used to evaluate well integrity and/or can be used as a repair diagnostic tool for conventional oil and gas wells, wells for CO2 sequestration, geothermal wells, and other application. In-situ, 3-D high-resolution X-ray images of the wellbore can provide accurate imaging, which allows for location and characterization of well casing, or cement defects, and facilitates remedial cement/sealant repair.

Figure 4A:
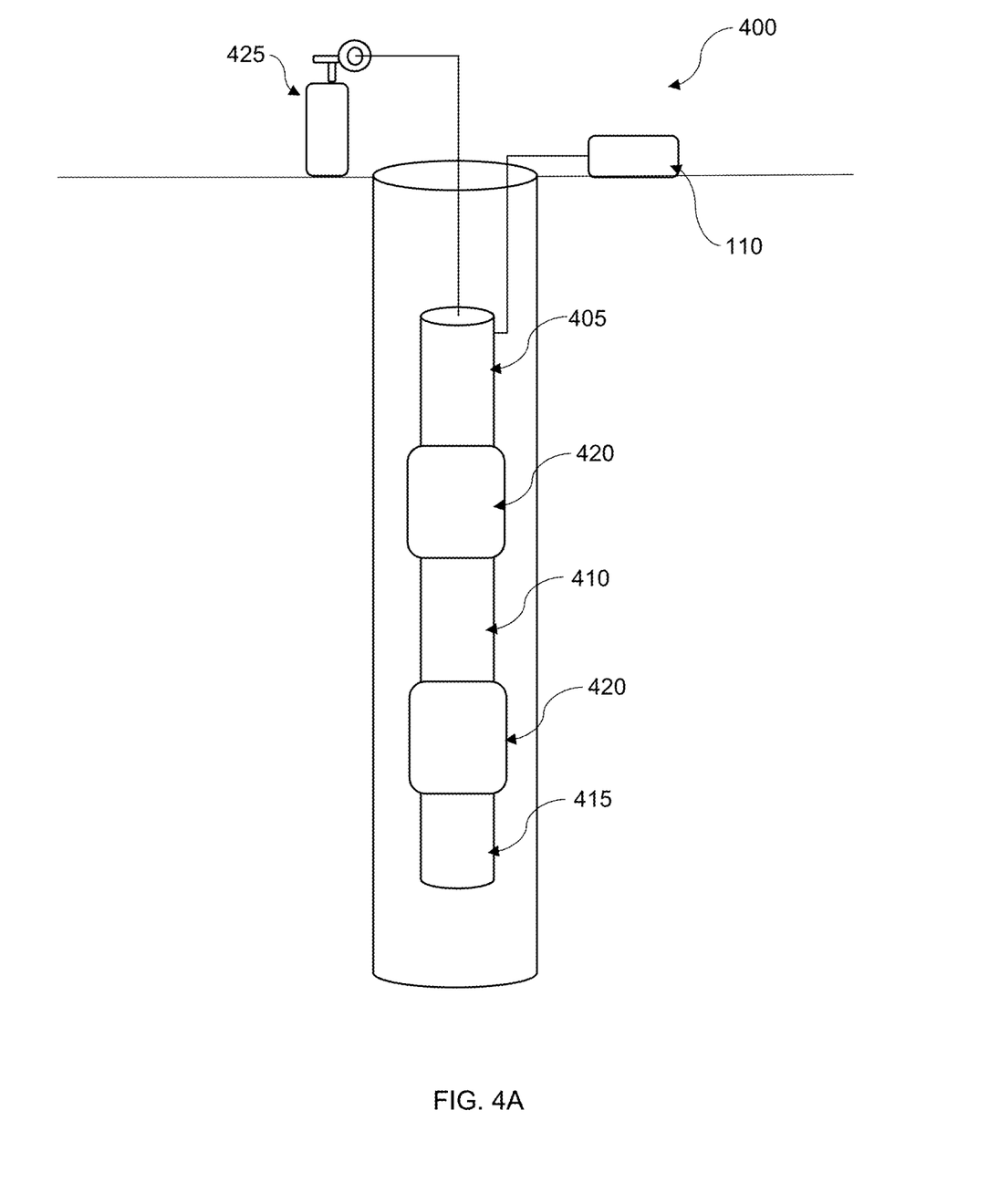
FIG. 4A depicts a block diagram of a wellbore inspection system in accordance with the disclosed embodiments.
Figure 4B:
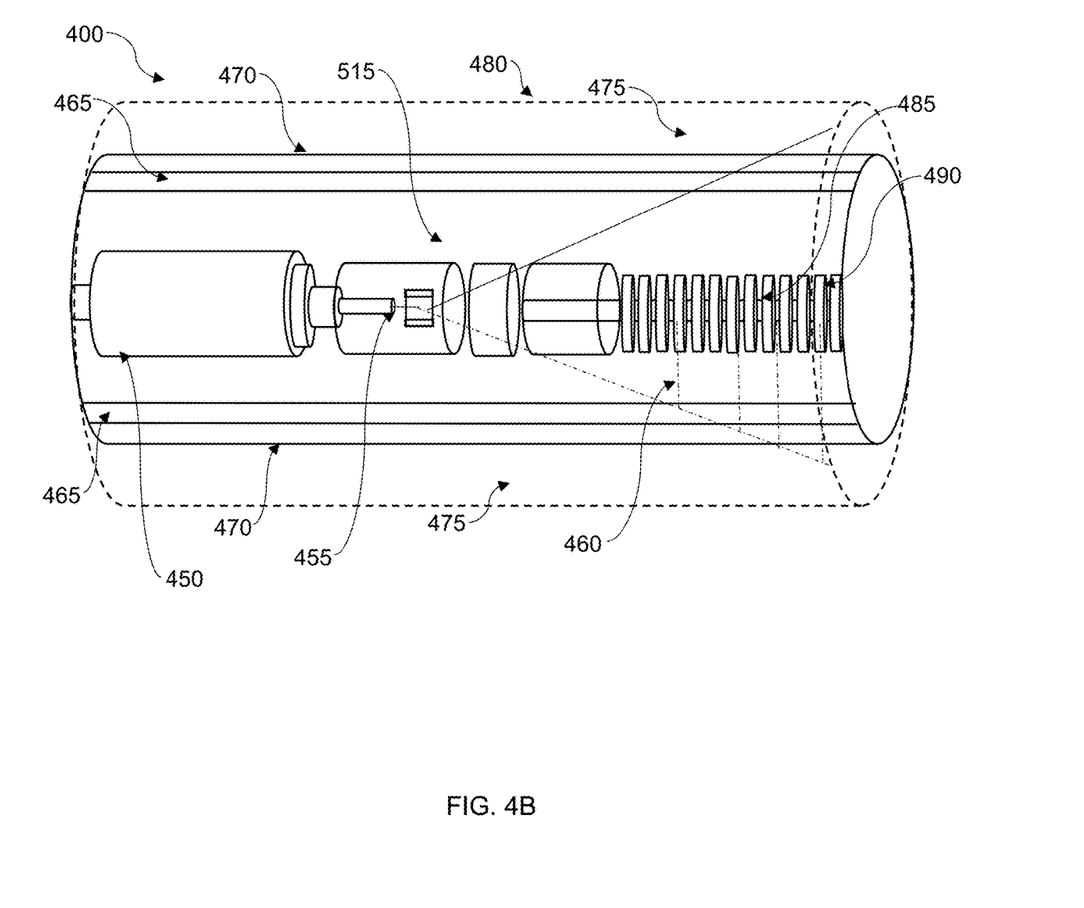
FIG. 4B depicts a diagram of a wellbore inspection system in accordance with the disclosed embodiments.

FIG. 4A illustrates a block diagram of the system for wellbore inspection 400. The system 400 can include three separate functional sections that include: an accelerator assembly 405, an X-ray target and collimation assembly 410, and a detector assembly 415. In FIG. 4B, the various separate functional areas are illustrated as three discreet assemblies that can be physically separated, but connected with a flexible linkage or connecting fixture 420. In an embodiment, the various sections and modules can be housed in one long assembly as shown in FIG. 4B. A computer system, such as computer system 110 and associated control system, along with a power source, can also be provided as an external, or integrated, module.

A positioning assembly 425 can also be provided to move the electron accelerator 405, the rotating collimator assembly 410, and the at least one detector 415 through a wellbore. In certain embodiments, the assembly 425 can comprise a winch, crane, drill string, drilling fluids, or other known apparatuses and methods for raising, lowering, and positioning items, such as logging tools through a borehole.

FIG. 4B illustrates an embodiment of a system 400 for wellbore inspection. The system includes a compact, high-energy electron accelerator 450 that is used to create an intense energy X-ray source 455. A beam bending assembly that can include a rotating permanent magnet, target, and pencil beam collimator are used to deflect the X-ray source 455. Compton scattered X-rays 460, scatter off of the casing 465, cement 470, and rock 475. Directional X-ray detectors 485 are provided in a sonde 490 that can provide data to a computer system for creating 3-D tomographic images of casing 465, cement 470, and external rock 475, all associated with a wellbore 480.

Figure 5:
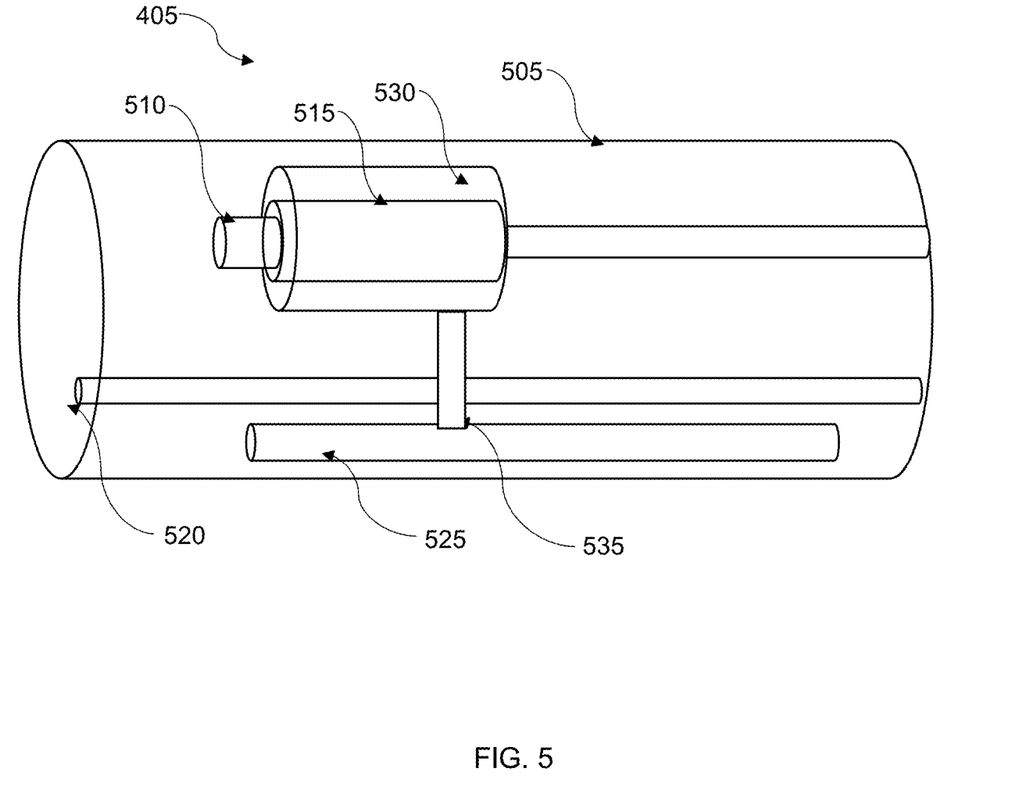
FIG. 5 depicts a diagram of an accelerator assembly in accordance with the disclosed embodiments.

The electron accelerator assembly 405 is illustrated in FIG. 5. The accelerator assembly 405 includes a housing 505 that houses an electron gun 510 and RF accelerating cavity 515. An electron accelerator cavity 515 can comprise a cavity, accelerating cavity, RF accelerating cavity, or resonator. The resonator can comprise a copper RF accelerating cavity, although other cavities may also be used, in conjunction with the electron gun 510.

The electron accelerator assembly 405 includes connections 520 that can comprise electrical connections for power, control systems, and data collection. It should be understood that the connections 520 for power, control systems, and data collection may terminate in the accelerator assembly 405 or may pass through the accelerator assembly 405 to the down-line X-ray target and collimation assembly 410 and/or the detector assembly 415.

The electron accelerator assembly 405 can include control electronics 525. The control electronics 525 can include control equipment configured to regulate the accelerating cavity 515 and the electron gun 510. The control electronics 525 can be operably connected to the connections 520, includes the control system connections and power connections. It should be understood that the control electronics 525 can be embodied as hardware or software provided by the associated computer system 110.

The accelerator assembly 405 further includes cooling equipment 530 used to control the temperature of the accelerating cavity 515 and associated electronics. The accelerator cavity 515 and/or surrounding area may require vacuum. As such, vacuum equipment 535 including, but not limited to, a vacuum pump, vacuum seals, and vacuum chambers/pipes can also be included in the accelerator assembly 405, according to design considerations.

It should be noted that the accelerator assembly preferably has a small diameter. In particular, the diameter of the assembly must be small enough to fit inside the wellbore where the system will be used.

The electron gun 510 emits electrons into the accelerating cavity 515. The electrons are subject to an electric field in each cell of the cavity 515, which accelerates the electron toward the exit of the accelerator. Each cell in the cavity 515 further accelerates the electron until the electron reaches a desired energy. In a preferred embodiment, this energy ranges between 5-40 MeV, although other energies are also possible. In certain embodiments, the electron accelerator assembly 405 can be used to create a high-energy electron beam.

Figure 6:
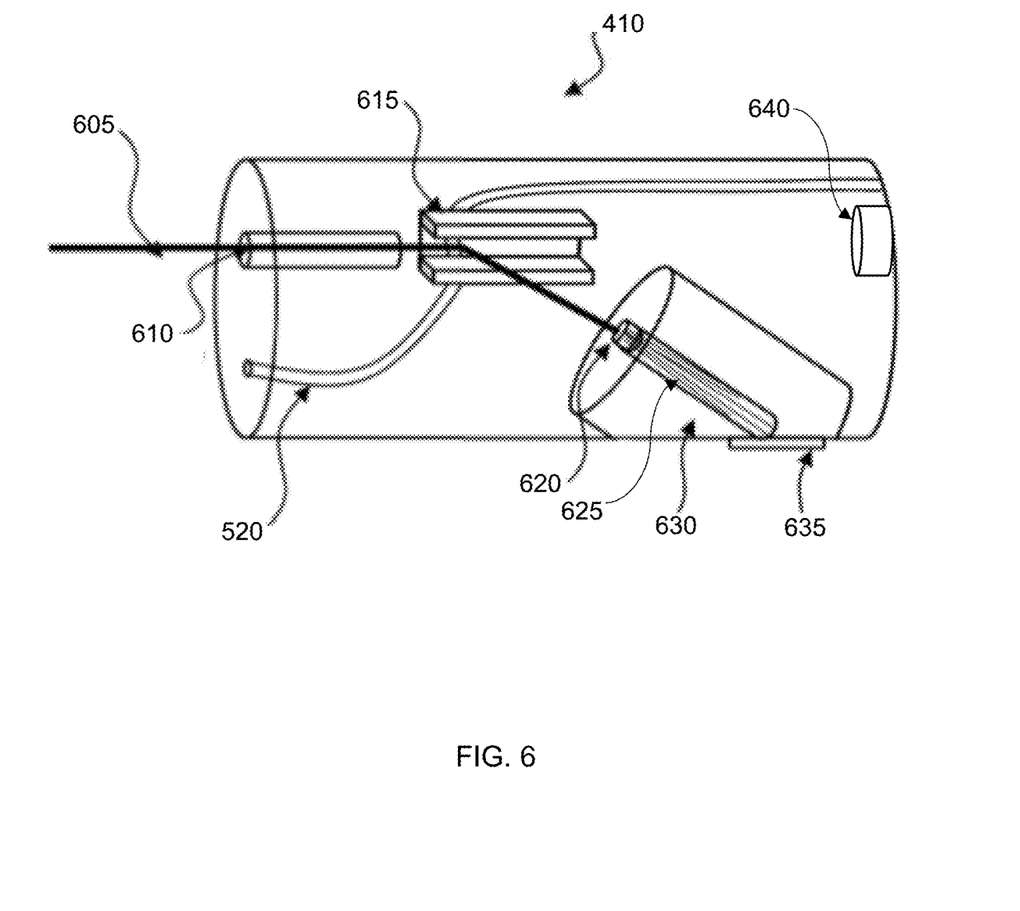
FIG. 6 depicts a diagram of an X-ray target and collimation assembly in accordance with the disclosed embodiments.

The high-energy electron beam, produced by the electron accelerator beam assembly 405 is configured to be incident on a target 620 configured in the target and collimation assembly 410, illustrated in FIG. 6. The electron beam 605 enters the target and collimator assembly 410 through a beam entrance port 610. A beam-bending device 615 is used to divert the electron beam 605 onto an X-ray target 620. In certain embodiments, the beam 605 can be bent by approximately 30 degrees although other angles may be appropriate in certain embodiments.

The beam-bending device 615 can comprise a bending magnet, electromagnet, electrostatic plates, or a permanent magnet. The required characteristic of the beam-bending device 615, is that it creates an electromagnetic field sufficient to divert the passing electron beam 605. In certain embodiments, the beam-bending device 615 can be configured to move or rotate, such that the direction the electron beam 605 is diverted changes as a function of time.

The electron beam 605 travels out of the accelerator assembly 405 and through the X-ray target and collimation assembly 410 in a vacuum pipe, until it reaches the target 620. The X-ray target 620 is a material (e.g., a Bremsstrahlung target) that creates X-rays as a result of the incident high-energy electron beam 605.

The resulting X-rays 625 can be sent through a dense metal collimator 630 in order to collimate the X-Ray beam 625, so that the beam 625 has a narrow diameter. The collimator 630 can, most commonly, be embodied as a pencil beam collimator, resulting in a beam of X-rays 625 which pass through a beam window 635, and into the rock and other material surrounding the wellbore. In certain embodiments, the collimator 630 can be configured to rotate within the X-ray and collimation assembly 410 in order to produce a fan-shaped beam (or other-shaped beam) that creates a partial or complete X-ray cone. This allows the system 400 to interrogate more area at one time.

In certain embodiments, a control to turn the beam-bending device 615 on and off can be provided as a hard-wired switch, or via a control associated with the computer system 110. When the beam-bending device 615 is off, the beam can proceed straight ahead into a diagnostic area 640, either in the target/collimation assembly 410, or in the detector assembly 415. In such a case, the electron beam 605 can remain in vacuum until it strikes the diagnostics 640. The diagnostics 640 can monitor the performance of the beam, and in particular, ensure that the beam energy is correct.

It should be noted that electronic power, control, and data transmission 520 can be provided to the target and collimator assembly from the computer system 110, and/or control system, and/or power source.

The X-rays 625 sent out of the target and collimation assembly 630 Compton backscatter off the surrounding material with a characteristic energy for a given deflection angle. The backscattering can be collected at the detector assembly 415, illustrated in FIG. 7.

Figure 7:
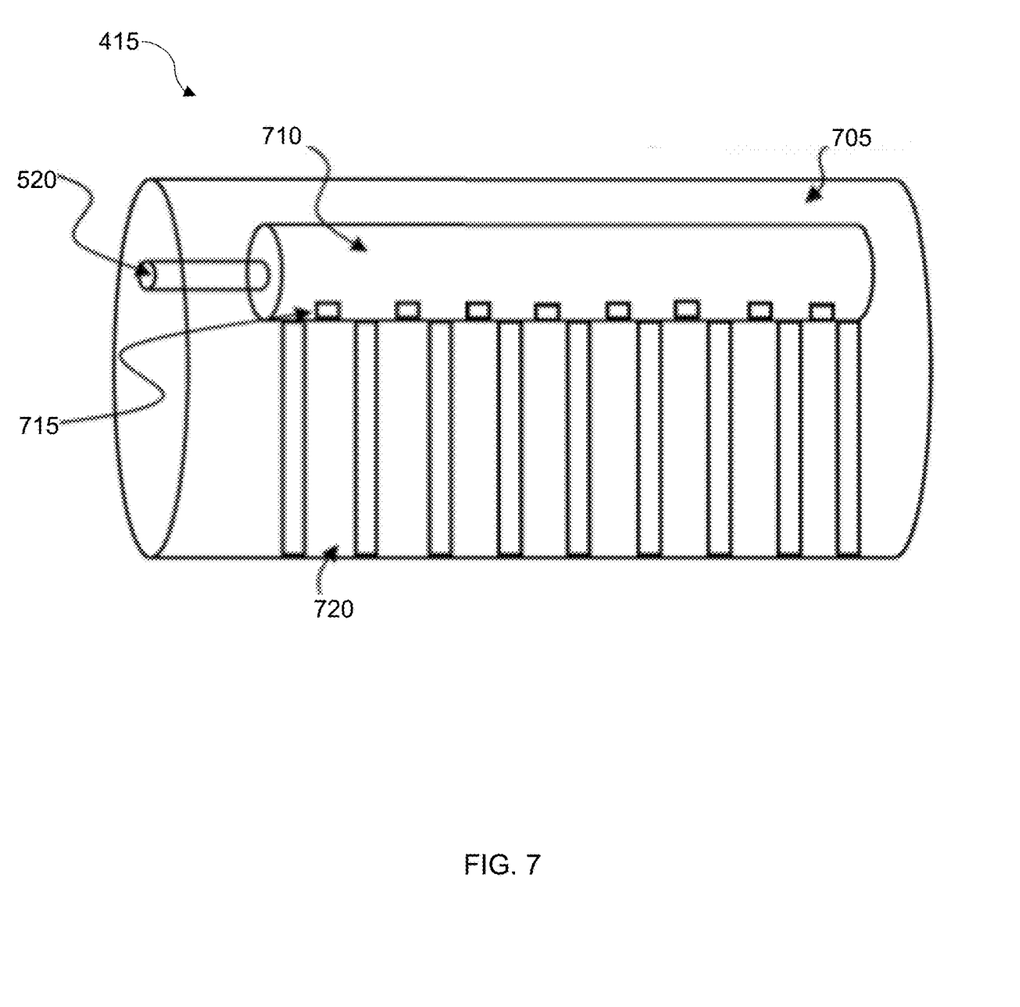
FIG. 7 depicts a diagram of a detector assembly in accordance with the disclosed embodiments.

The detector assembly 415 includes a longitudinal array of detector elements 705. Data acquisition and processing electronics 710 can be provided in the assembly 415, and/or at the computer system 110, and are connected to power, control, and data transmission lines 520.

A linear set of detector elements 715 are provided along the length of the detector assembly 415 between the detector collimation channels 720. The detector elements 715 can extend cylindrically for enhanced resolution (in the case of a fanned beam of X-rays). The collimation channels 720 are provided so that only the Compton-scattered X-rays that are coming from the desired direction (or angle) impinge on the detector elements 715. It should be appreciated that FIG. 7 illustrates perpendicular channels only, but additional and more complex geometries could be used with multiple channels and detectors at various angles, according to design considerations.

The series of X-ray detectors 715 provided between collimation channels 720 detect the Compton backscattered X-rays. The data can be collected and processed by a computer system 110, or by on-board detecting equipment, to provide an image of the wellbore and its surrounding geological formation at any given location.

Finally, the assembly 400 can be moved through the wellbore using a winch, crane, drill string, drilling fluids, or other known methods for raising, lowering, and positioning items, such as logging tools through a borehole. The resulting collection of X-rays from the length of the wellbore, or simply a desired section of the wellbore, can be provided to a computer system for analysis. The computer can be used to generate an image of the wellbore and can further be used to identify defects in the cement or casing of the wellbore, as well as potential extractable resources in the surrounding material.

The embodiments leverage compact accelerators to create an intense high-energy X-ray beam that is integrated into a system that makes use of industrial tomographic imaging capability to create a practical down-hole configuration. The embodiments provide the needed precision tool for inspection and repair of well casing or cement defects, preventing leakage of methane and/or CO2 into the environment, or injections into unintended zones in geothermal, CO2 sequestration, or natural gas wells.

Figure 8:
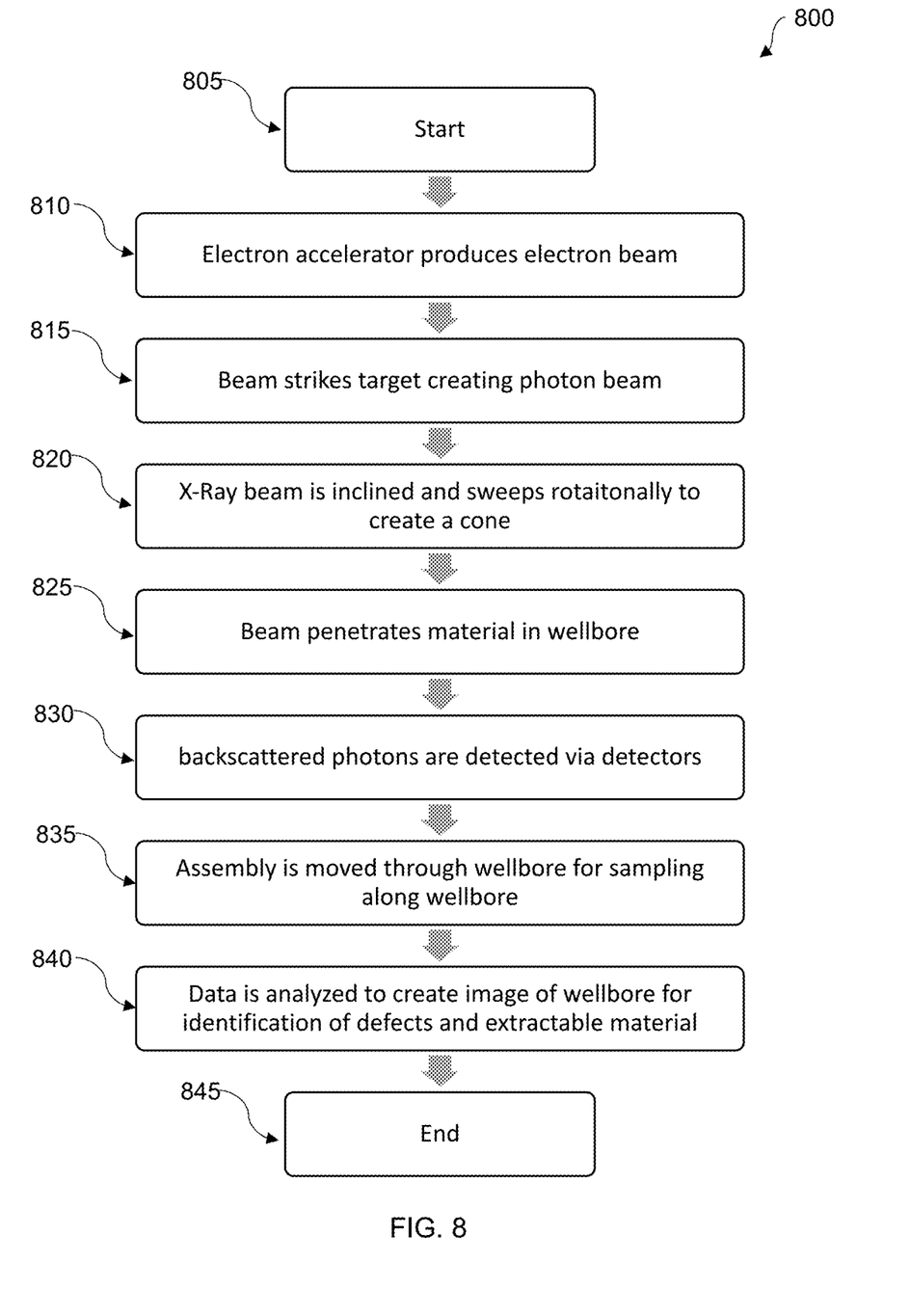
FIG. 8 depicts a flow chart of steps associated with a method for inspecting a wellbore in accordance with the disclosed embodiments.

FIG. 8 illustrates a method 800 for identifying defects and extractable resources in according to an embodiment. The method begins at 805.

In such an embodiment, a compact electron accelerator is used to produce a high-energy (e.g. approximately 10 MeV) electron beam as shown at 810. The electron beam, strikes a target, generating an intense beam of Bremsstrahlung photons (e.g. a continuous X-ray stream) as shown at 815.

These photons are created over a broad range of energies, with the mean energy being approximately 600 keV, and maximum energy approaching 10 MeV. The X-ray pencil beam can be inclined at 30° (or other such angle) with respect to the axis of the bore, and sweeps out a cone, at a given position, down the well as illustrated at 820. It should be appreciated that in other embodiments, the beam can be inclined at other angles in order to accommodate a desired inspection radius.

The beam penetrates the casings, cement, and the surrounding rock or other material, for example, in and around the wellbore, as illustrated at 825. Detectors in the same sonde measure photons that have been reflected by Compton scattering, as shown at 830. In this example, the photon energy of the photons scattered 120° is approximately 220 keV which is high enough to allow long paths from the point of scattering through casings, cement, and rock back to the detectors.

Step 835 shows that the assembly can be moved through the borehole. As the assembly moves down the borehole, the various detectors, arranged along it, sample the scattered X-rays at different depths, measuring the material density at the point of scattering. Detector elements are set in slots or holes, collimation channels, within a dense housing to allow them to only see a select area. This, along with the inclined beam and known rotational angle of the collimator, allows them to image scattering from a point in space that moves as the collimator rotates and as the device proceeds downward in the well. Detector elements farther from the X-ray source may have larger elements and geometric acceptance to compensate for lower photon fluxes scattered from rock at greater depths. It should be understood that, in some embodiments, the detectors and the associated slots or holes can be of varying complexity. Simple designs may only accept scattered X-rays that are perpendicular to the bore. More complicated designs may accept X-rays from other angles, thereby increasing the amount of data collected, which improves the quality of the images. The advance rate is adjustable, and set by photon counting statistics for the deepest penetration desired.

The data collected by the detectors can be analyzed at step 840 to create an image of the wellbore, which can be analyzed to identify defects in the well and/or the location of extractable resources. The method ends at 845.

In another embodiment, the parameters of the configuration can be adjusted for optimization. In such embodiments, the energy and the average vs. peak power of the accelerator can be varied. The cone angle vs. time can be adjusted (e.g. a slow scan) for better resolution. A high-resolution mode for a region of particular interest can be provided. Multiple sets of X-ray detectors and collimators can be set at varying angles for improved resolution. Multiple measurements through multiple X-ray paths can be used to give computed tomographic radial information.

In certain embodiments, the system can include both the accelerator and an imaging system confined inside a tubular tool not exceeding 10 cm in diameter. In certain embodiments, the accelerator can include a compact high frequency accelerator with a compact, efficient magnetron RF power source. In certain embodiments, standard wired or wireless data transmission via a network can be used to move data to a computer system on the surface. In other embodiments, a high-speed fiber optic data transmission system can be used to move data to the surface. Imaging software can be used for converting the detected data into a signal and/or analyzing such data. In other embodiments, the high-resolution X-ray imaging system can be run in a wellbore in logging mode (i.e., continuous imaging while moving up or down in the well).

The embodiments disclosed herein can be used to efficiently identify and eliminate leakage of gases, and other chemicals, from around well casings, reducing greenhouse gas emissions, assuring that injected CO2 remains sequestered, preventing injections into unintended zones in geothermal wells, and providing the tool needed for repairing damaged wells.

The system provides capabilities well beyond those of present ultrasonic techniques and can provide high-resolution images through multiple steel well casings, cement layers, and surrounding rock structure. The accelerator production of-rays gives a 20-fold increase in photons over conventional X-ray tubes and an order of magnitude increase in photon energy.

In particular, the embodiments take advantage of the higher energy and higher intensity provided by the system, along with directional control to reliably measure formation properties. According to the embodiments disclosed herein, it is possible to accommodate longer detector spacing and higher logging speeds without sacrificing measurement precision. High-energy X-rays from a particle accelerator improve formation penetration beyond any decompression and local fractures that result from drilling the borehole, beyond penetration of drilling fluids in the rock, and provide the ability to review discrete locations around the borehole and into the rock at some distance (as opposed to a "global average" near the borehole). The embodiments further provide the ability to detect formation rock heterogeneity features (and rock mineralogy) away from the borehole. This allows for improved detection of discontinuities, such as natural fractures, layer interfaces, inclusions, and the like.

Based on the foregoing, it can be appreciated that a number of embodiments, preferred and alternative, are disclosed herein. For example, a wellbore inspection system comprises an electron accelerator to generate X-rays, a rotating collimator assembly configured to produce a cone of X-rays, and at least one detector assembly configured to collect backscattered X-rays.

In an embodiment, the electron accelerator further comprises an RF accelerating cavity and an electron gun. In an embodiment the rotating collimator assembly further comprises a rotating magnet, an X-ray target, and a beam collimator. The beam collimator can further comprise a pencil beam collimator. In an embodiment the at least one detector assembly further comprises a plurality of longitudinally arranged X-ray detectors configured between a plurality of collimation channels.

In an embodiment, the wellbore inspection system further comprises an assembly configured to move the electron accelerator, the rotating collimator assembly, and the at least one detector through a wellbore.

In an embodiment, the wellbore inspection system further comprises a computer system configured to receive data from the detector and generate an image of a wellbore.

In another embodiment, a wellbore inspection apparatus comprises an electron accelerator to generate X-rays, a rotating collimator assembly configured to produce a cone of X-rays, and at least one detector assembly configured to collect backscattered X-rays.

In an embodiment, the electron accelerator further comprises an RF accelerating cavity and an electron gun. In an embodiment, the rotating collimator assembly further comprises a rotating magnet, an X-ray target and a beam collimator. The beam collimator can further comprise a pencil beam collimator. In an embodiment at least one detector assembly further comprises a plurality of longitudinally arranged X-ray detectors configured between a plurality of collimation channels.

In an embodiment, the apparatus further comprises an assembly configured to move the electron accelerator, the rotating collimator assembly, and the at least one detector through a wellbore.

In an embodiment, the apparatus further comprises a computer system configured to receive data from the detector and generate an image of a wellbore.

In another embodiment, a wellbore inspection method comprises generating an electron beam with an electron accelerator, producing a cone of X-rays from the electron beam with a rotating collimator assembly, and collecting backscattered X-rays with at least one detector assembly.

In an embodiment, the electron accelerator further comprises an RF accelerating cavity and an electron gun.

In an embodiment, the method further comprises rotating a magnet by which the electron beam passes, directing the electron beam on an X-ray target, and collimating resulting X-rays with a beam collimator.

In an embodiment, the at least one detector assembly further comprises a plurality of longitudinally arranged X-ray detectors configured between a plurality of collimation channels.

In an embodiment, the wellbore inspection further comprises positioning the electron accelerator, the rotating collimator assembly, and the at least one detector in a wellbore with a positioning assembly.

In another embodiment, the wellbore inspection method further comprises analyzing the collected backscattered X-rays with a computer system, creating an image of a wellbore according to the analysis with the computer system, and identifying defects in the wellbore with a computer system.

It will be appreciated that variations of the above-disclosed and other features and functions, or alternatives thereof, may be desirably combined into many other different systems or applications. For example, in an embodiment, it will be appreciated that various, presently unforeseen or unanticipated alternatives, modifications, variations or improvements therein may be subsequently made by those skilled in the art which are also intended to be encompassed by the following claims.

What is claimed is:

1. A wellbore inspection system comprising:
   a Radio Frequency (RF) powered electron accelerator to generate X-rays, said Radio Frequency (RF) powered electron accelerator further comprising:
     a housing;
     an RF accelerating cavity;
     an electron gun;
     cooling equipment for controlling the temperature of the RF accelerating cavity; and
     vacuum equipment for drawing a vacuum in the RF accelerating cavity, wherein the Radio Frequency (RF) powered electron accelerator is configured to generate an electron beam of between 5 MeV-40 MeV and fit down a wellbore;
   a rotating beam collimator assembly configured to produce a cone of X-rays; and
   at least one detector assembly configured to collect backscattered X-rays, the at least one detector assembly comprising a plurality of longitudinally arranged X-ray detectors.

2. The wellbore inspection system of claim 1 wherein said rotating beam collimator assembly further comprises:
   a rotating magnet;
   an X-ray target; and
   a beam collimator.

3. The wellbore inspection system of claim 2 wherein said beam collimator further comprises a pencil beam collimator.

4. The wellbore inspection system of claim 1 wherein said at least one detector assembly further comprises:
   a plurality of detector collimation channels wherein each of said plurality of longitudinally arranged X-ray detectors are configured between respective detector collimation channels of said plurality of detector collimation channels.

5. The wellbore inspection system of claim 1 further comprising:
   an assembly configured to move said RF powered electron accelerator, said rotating beam collimator assembly, and said at least one detector through a wellbore.

6. The wellbore inspection system of claim 1 further comprising:
   a computer system configured to receive data from said detector and generate an image of a wellbore.

7. A wellbore inspection apparatus comprising:
   a Radio Frequency (RF) powered electron accelerator to generate X-rays;
   a rotating beam collimator assembly connected to the RF powered electron accelerator and configured to produce X-rays; and
   at least one detector assembly connected to the rotating beam collimator assembly and configured to collect backscattered X-rays, the at least one detector assembly further comprising a plurality of longitudinally arranged X-ray detectors configured between a plurality of detector collimation channels.

8. The apparatus of claim 7 wherein said RF powered electron accelerator further comprises:
   a housing;
   an RF accelerating cavity;
   an electron gun;
   cooling equipment for controlling the temperature of the RF accelerating cavity; and
   vacuum equipment for drawing a vacuum in the RF accelerating cavity, wherein the electron accelerator is configured to generate an electron beam of 5 MeV-40 MeV and fit down a wellbore.

9. The apparatus of claim 7 wherein said rotating beam collimator assembly further comprises:
   a rotating magnet;
   an X-ray target; and
   a beam collimator.

10. The apparatus of claim 9 wherein said beam collimator further comprises a pencil beam collimator.

11. The apparatus of claim 7 further comprising:
    an assembly configured to move said electron accelerator, said rotating beam collimator assembly, and said at least one detector through a wellbore.

12. The apparatus of claim 7 further comprising:
    a computer system configured to receive data from said detector and generate an image of a wellbore.

13. A wellbore inspection method comprising:
    generating an electron beam with a Radio Frequency (RF) powered electron accelerator;
    producing a cone of X-rays from said electron beam with a rotating beam collimator assembly; and
    collecting backscattered X-rays with at least one detector assembly comprising a plurality of longitudinally arranged X-ray detectors, wherein said at least one detector assembly further comprises a plurality of detector collimation channels, wherein each X-ray detector of said plurality of longitudinally arranged X-ray detectors is configured between at least one of said plurality of collimation channels.

14. The wellbore inspection method of claim 13 wherein said RF powered electron accelerator further comprises:
    a housing;
    an RF accelerating cavity;
    an electron gun;

cooling equipment for controlling the temperature of the RF accelerating cavity; and vacuum equipment for drawing a vacuum in the RF accelerating cavity, wherein the electron accelerator is configured to generate an electron beam of 5 MeV-40 MeV and fit down a wellbore.

15. The wellbore inspection method of claim 13 further comprising:

rotating a magnet by which said electron beam passes;
directing said electron beam on an X-ray target; and
collimating resulting X-rays with a beam collimator.

16. The wellbore inspection method of claim 13 further comprising:

positioning said RF powered electron accelerator, said rotating beam collimator assembly, and said at least one detector in a wellbore with a positioning assembly.

17. The wellbore inspection method of claim 13 further comprising:

analyzing said collected backscattered X-rays with a computer system;
creating an image of a wellbore according to said analysis with said computer system; and
identifying defects in said wellbore with a computer system.

* * * * *